(12) United States Patent
N'guessan (10) Patent No.: US 12,309,459 B2
(45) Date of Patent: May 20, 2025

(54) METHODS, SYSTEMS, AND MEDIA FOR PRESENTING RECOMMENDED MEDIA CONTENT ITEMS BASED ON COMPLEMENTARY MEDIA CONTENT ITEM PAIRS

(71) Applicant: Google LLC, Mountain View, CA (US)

(72) Inventor: Sylvia N'guessan, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/758,792

(22) Filed: Jun. 28, 2024

(65) Prior Publication Data
US 2024/0357204 A1    Oct. 24, 2024

Related U.S. Application Data

(63) Continuation of application No. 17/976,209, filed on Oct. 28, 2022, now Pat. No. 12,047,646.

(51) Int. Cl.
*H04N 21/466* (2011.01)
*H04N 21/472* (2011.01)

(52) U.S. Cl.
CPC ....... *H04N 21/4668* (2013.01); *H04N 21/472* (2013.01)

(58) Field of Classification Search
CPC .................... H04N 21/44016; H04N 21/4826
(Continued)

(56) References Cited

U.S. PATENT DOCUMENTS 11,395,032 B2 *   7/2022  Sen .................. H04N 21/44204
2008/0133034 A1 *  6/2008  Pauws .............. H04N 21/41265
(Continued)

OTHER PUBLICATIONS

Notice of Allowance from U.S. Appl. No. 17/976,209 dated Mar. 20, 2024, 12 pp.

*Primary Examiner* — Cynthia M Fogg
(74) *Attorney, Agent, or Firm* — Shumaker & Sieffert, P.A.

(57) ABSTRACT

Methods, systems, and media for presenting recommended media content items based on complementary media content item pairs are presented. In some embodiments, the method includes: receiving an update to a display area within a user interface, wherein the update comprises a plurality of media content items and wherein the display area comprises (i) a first region that is displayed and that is navigable by a user of the user interface and (ii) a second region that is concealed from display and that is not navigable by the user of the user interface; determining, for each of the plurality of media content items, a complementary media content item, thereby obtaining a complementary pair of media content items that includes a first media content item and a second media content item; selecting a first subset of media content items from the plurality of media content items for the first region of the display area, wherein the first subset of media content items includes the first media content item in the complementary pair of media content items; selecting a second subset of media content items from the plurality of media content items for the second region of the display area, wherein the second subset of media content items includes the second media content item in the complementary pair of media content items; causing at least one media content item from the first subset of media content items to be presented in the first region of the display area; determining a user engagement signal from the at least one media content item being presented in the first region of the display area; replacing a third media content item queued for display in the first region of the display area with a fourth media content item from the second subset of media content items, wherein the third media content item is selected based on the user engagement signal and wherein the fourth media content item is the complementary pair corresponding to the
(Continued)

third media content item; and causing the fourth media content item to be presented in the first region of the display area.

18 Claims, 7 Drawing Sheets

(58) Field of Classification Search
USPC .......................................................... 725/61
See application file for complete search history.

(56) References Cited

U.S. PATENT DOCUMENTS

| | | |
|---|---|---|
| 2016/0077686 A1 | 3/2016 | Cosío et al. |
| 2017/0013297 A1 | 1/2017 | Wei et al. |
| 2018/0013804 A1 | 1/2018 | Bates et al. |
| 2018/0014037 A1 | 1/2018 | Venkatraman et al. |
| 2020/0007936 A1 | 1/2020 | Salomatin et al. |
| 2022/0067088 A1 | 3/2022 | Aryan |
| 2022/0164078 A1 | 5/2022 | Devries et al. |
| 2024/0147009 A1 | 5/2024 | N'guessan |

\* cited by examiner

METHODS, SYSTEMS, AND MEDIA FOR PRESENTING RECOMMENDED MEDIA CONTENT ITEMS BASED ON COMPLEMENTARY MEDIA CONTENT ITEM PAIRS

RELATED APPLICATION

This application is a continuation of U.S. application Ser. No. 17/976,209 filed Oct. 28, 2022, the entire contents which are incorporated herein by reference.

TECHNICAL FIELD

The disclosed subject matter relates to methods, systems, and media for presenting recommended media content items based on complementary media content item pairs.

BACKGROUND

Many users stream videos, music, social media updates, and movies from a variety of platforms, and each platform typically uses a recommendation system to populate a user interface with media content for the user to explore. Often, the recommendation system can provide updates with new content for the user to browse as the user navigates. In order to provide users an enjoyable experience, each update needs to include content that reflects the user's preferences. Recommendation systems can take in many user signals and can often succeed at recommending enjoyable content from the large platform library with each successive update. In particular, the recommendation system can send an update that has media content items with a wide variety of attributes.

However, when the user interface adds the additional recommended content to the end of the content list, the user must generally scroll through content that is outdated compared to what the recommendation system has included in the most recent update. Additionally, a user can indicate their preference for media content with certain attributes, and the user interface is not able to present more media content with those attributes to the user until the next update from the recommendation system.

Accordingly, it is desirable to provide new mechanisms for presenting recommended media content items based on complementary media content item pairs.

SUMMARY

In accordance with some embodiments of the disclosed subject matter, a method for presenting recommended media content items is provided, the method comprising: receiving an update to a display area within a user interface, wherein the update comprises a plurality of media content items and wherein the display area comprises (i) a first region that is displayed and that is navigable by a user of the user interface and (ii) a second region that is concealed from display and that is not navigable by the user of the user interface; determining, for each of the plurality of media content items, a complementary media content item, thereby obtaining a complementary pair of media content items that includes a first media content item and a second media content item; selecting a first subset of media content items from the plurality of media content items for the first region of the display area, wherein the first subset of media content items includes the first media content item in the complementary pair of media content items; selecting a second subset of media content items from the plurality of media content items for the second region of the display area, wherein the second subset of media content items includes the second media content item in the complementary pair of media content items; causing at least one media content item from the first subset of media content items to be presented in the first region of the display area; determining a user engagement signal from the at least one media content item being presented in the first region of the display area; replacing a third media content item queued for display in the first region of the display area with a fourth media content item from the second subset of media content items, wherein the third media content item is selected based on the user engagement signal and wherein the fourth media content item is the complementary pair corresponding to the third media content item; and causing the fourth media content item to be presented in the first region of the display area.

In some embodiments, determining the complementary media content item comprises: determining a similarity score between the first media content item and the second media content item; and, based on determining that the similarity score is less than a threshold value, generating an indication that the first media content item is associated with the second media content item as the complementary pair of media content items.

In some embodiments, the similarity score is determined by calculating cosine similarity between a first vector representing the first media content item and a second vector representing the second media content item.

In some embodiments, the user engagement signal comprises a positive user interaction with a particular media content item.

In some embodiments, the third media content item is selected based on a determination that the particular media content item and the third media content item have a similarity score that is less than a threshold value.

In some embodiments, the user engagement signal comprises a negative user interaction with a particular media content item.

In some embodiments, the third media content item is selected based on a determination that the particular media content item and the third media content item have a similarity score that is greater than a threshold value.

In accordance with some embodiments of the disclosed subject matter, a system for presenting recommended media content items is provided, the system comprising: a memory and a hardware processor that is configured to: receive an update to a display area within a user interface, wherein the update comprises a plurality of media content items and wherein the display area comprises (i) a first region that is displayed and that is navigable by a user of the user interface and (ii) a second region that is concealed from display and that is not navigable by the user of the user interface; determine, for each of the plurality of media content items, a complementary media content item, thereby obtaining a complementary pair of media content items that includes a first media content item and a second media content item; select a first subset of media content items from the plurality of media content items for the first region of the display area, wherein the first subset of media content items includes the first media content item in the complementary pair of media content items; select a second subset of media content items from the plurality of media content items for the second region of the display area, wherein the second subset of media content items includes the second media content item in the complementary pair of media content items; cause at least one media content item from the first subset of media content items to be presented in the first region of the display area; determine a user engagement signal from the at least one media content item being presented in the first region of the display area; replace a third media content item queued for display in the first region of the display area with a fourth media content item from the second subset of media content items, wherein the third media content item is selected based on the user engagement signal and wherein the fourth media content item is the complementary pair corresponding to the third media content item; and cause the fourth media content item to be presented in the first region of the display area.

In accordance with some embodiments of the disclosed subject matter, a non-transitory computer-readable medium containing computer executable instructions that, when executed by a processor, cause the processor to execute a method for presenting recommended media content items is provided, the method comprising: receiving an update to a display area within a user interface, wherein the update comprises a plurality of media content items and wherein the display area comprises (i) a first region that is displayed and that is navigable by a user of the user interface and (ii) a second region that is concealed from display and that is not navigable by the user of the user interface; determining, for each of the plurality of media content items, a complementary media content item, thereby obtaining a complementary pair of media content items that includes a first media content item and a second media content item; selecting a first subset of media content items from the plurality of media content items for the first region of the display area, wherein the first subset of media content items includes the first media content item in the complementary pair of media content items; selecting a second subset of media content items from the plurality of media content items for the second region of the display area, wherein the second subset of media content items includes the second media content item in the complementary pair of media content items; causing at least one media content item from the first subset of media content items to be presented in the first region of the display area; determining a user engagement signal from the at least one media content item being presented in the first region of the display area; replacing a third media content item queued for display in the first region of the display area with a fourth media content item from the second subset of media content items, wherein the third media content item is selected based on the user engagement signal and wherein the fourth media content item is the complementary pair corresponding to the third media content item; and causing the fourth media content item to be presented in the first region of the display area.

In accordance with some embodiments of the disclosed subject matter, a system for presenting recommended media content items is provided, the system comprising: means for receiving an update to a display area within a user interface, wherein the update comprises a plurality of media content items and wherein the display area comprises (i) a first region that is displayed and that is navigable by a user of the user interface and (ii) a second region that is concealed from display and that is not navigable by the user of the user interface; means for determining, for each of the plurality of media content items, a complementary media content item, thereby obtaining a complementary pair of media content items that includes a first media content item and a second media content item; means for selecting a first subset of media content items from the plurality of media content items for the first region of the display area, wherein the first subset of media content items includes the first media content item in the complementary pair of media content items; means for selecting a second subset of media content items from the plurality of media content items for the second region of the display area, wherein the second subset of media content items includes the second media content item in the complementary pair of media content items; means for causing at least one media content item from the first subset of media content items to be presented in the first region of the display area; means for determining a user engagement signal from the at least one media content item being presented in the first region of the display area; means for replacing a third media content item queued for display in the first region of the display area with a fourth media content item from the second subset of media content items, wherein the third media content item is selected based on the user engagement signal and wherein the fourth media content item is the complementary pair corresponding to the third media content item; and means for causing the fourth media content item to be presented in the first region of the display area.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments of the disclosed subject matter, mechanisms (which can include methods, systems, and media) for presenting recommended media content items based on complementary media content item pairs are provided.

Generally speaking, the mechanisms described herein relate to the presentation of media content items received in an update to a user interface, where the media content items are paired based on a measure of similarity between two media content items. For example, the mechanisms can determine pairings such that two media content items which contain complementary subject matter can be paired together. In continuing this example, the mechanisms can present a portion of the media content items in the user interface while reserving a complementary media content item in a complementary pair of media content items (e.g., by not queuing the complementary item for display). When the mechanisms receive a user engagement signal from the presented items, the mechanisms can determine whether to replace the media content items that have not been presented in the user interface (e.g., unviewed or unpresented media content items) by determining, according to the complementary pairs, that the user is likely to view and/or interact with additional content similar to the content which received the user engagement signal. Alternatively, the mechanisms can determine whether to replace the queued media content items by determining, according to the complementary pairs, that the user is likely to view and/or interact with additional content that is complementary to the content which received the user engagement signal.

For example, consider a user that is scrolling through videos in a streaming application that uses a video feed to present available content to the user. When the streaming application receives a new batch of content to add to the video feed (e.g., recommended videos), the mechanisms can first identify that the content contains six videos, each having the following topics: soccer, tennis, comedy sketch, podcast interview, gardening demonstration, and reality television. Continuing this example, the mechanisms can determine that, among the above series of topics, the soccer video is complementary to the gardening demonstration video, that the tennis video is complementary to the comedy sketch video and that the podcast interview video is complementary to the reality television video. In this example, the mechanisms can determine to initially display the soccer content, comedy sketch, and podcast interview in the video feed, and to not include the gardening demonstration, tennis content, and reality television video in the video feed. Alternatively, the mechanisms can cause the six videos in the new batch of content to be added to the video feed such that additional recommended content is presented to the user and can determine complementary videos within a video database that complement each of the six videos in the new batch of content that was added to the video feed.

In some embodiments, the user can engage with a particular video, such as providing a "like" reaction to the soccer video, and the mechanisms can further determine that the tennis video is similar to the soccer video and can replace the comedy sketch video (which is included in the video feed but has not yet been viewed in the video feed by the user) with the tennis video in the video feed. In this way, in some embodiments, the mechanisms can present recommended media content items based on complementary video pairs and based on current user engagement signals.

Note that, although some of the embodiments described herein use content type or content topic to evaluate how similar two pieces of content are to each other, this is merely illustrative. In some embodiments, any suitable content properties can be used in determining content similarity.

These and other features for presenting recommended media content items based on complementary media content item pairs are further described in connection with FIGS. 1-5.

Figure 1:
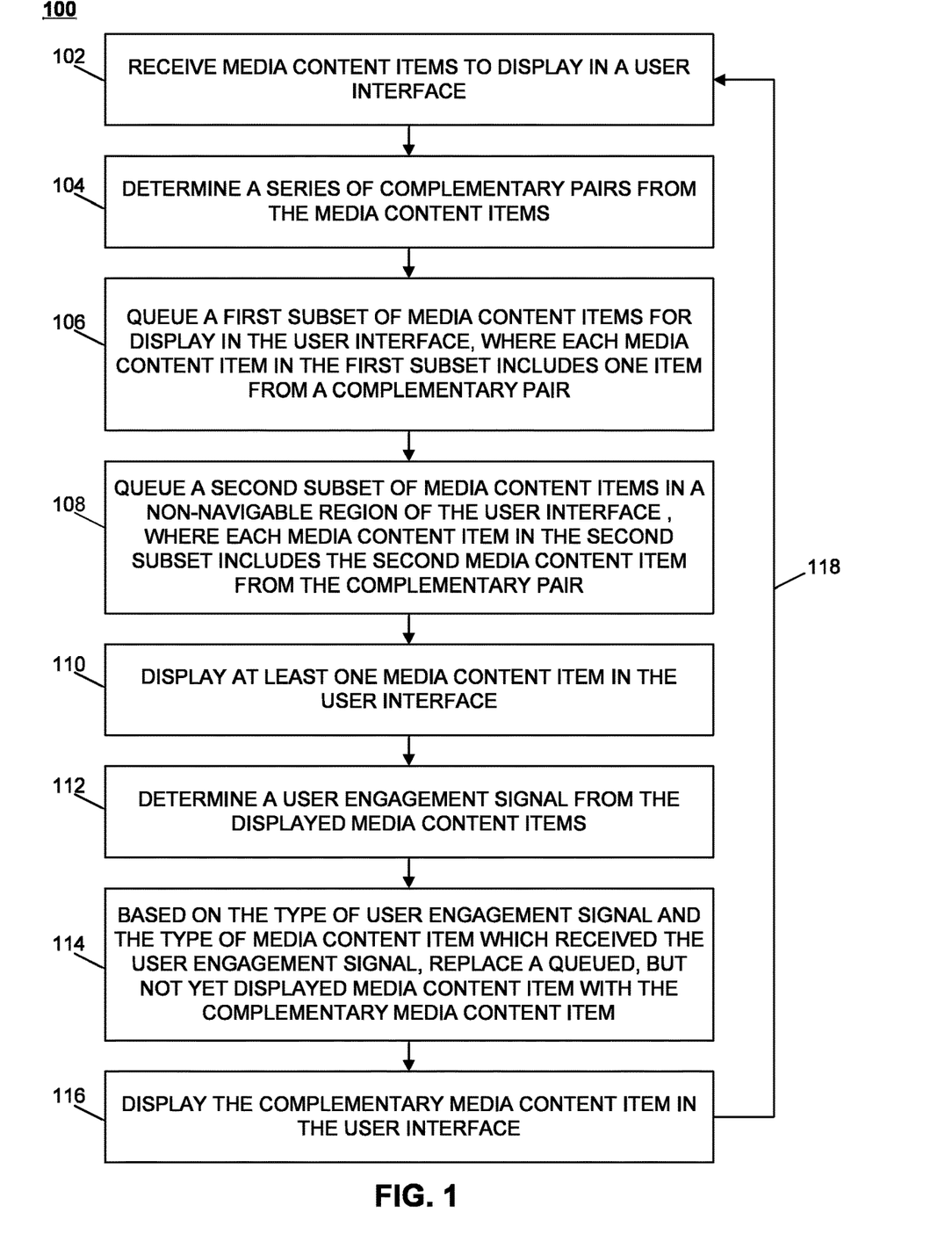
FIG. 1 shows an example flow diagram of an illustrative process for presenting recommended media content items based on complementary pairs in a user interface in accordance with some embodiments of the disclosed subject matter.

Turning to FIG. 1, an example flow diagram of an illustrative process 100 for presenting recommended media content items based on complementary pairs of media content items in a user interface in accordance with some embodiments of the disclosed subject matter is shown. In some embodiments, process 100 can run on a server, such as server 402, and/or a user device, such as user devices 406, described below in connection with FIG. 4. In some embodiments, process 100 can make use of communication networks, such as communication network 404.

In some embodiments, process 100 can begin at 102 when a user interface receives an update to a media content display area, such as media container 220 and/or video container 300 as described below in connection with FIGS. 2 and 3, respectively. In some embodiments, process 100 can receive any suitable number of media content items from a server associated with a program and/or application associated with the user interface. In some embodiments, process 100 can receive an update based on a request sent by the user interface and/or any suitable component of the user interface such as the media content display area.

In some embodiments, process 100 can continue at 104 by determining a series of complementary pairs from the media content items received at block 102. In some embodiments, determining each complementary pair can include any suitable calculations, such as calculating a similarity score between a first media content item and a second media content item. For example, in some embodiments, the cosine similarity value between the first media content item and the second media content item can be determined at block 104. In some embodiments, process 100 can determine that a pair of media content items are a complementary pair. For example, in some embodiments, process 100 can determine a similarity score for a pair of media content items, and process 100 can further determine that the similarity score is below any suitable threshold value. In this example, in some embodiments, process 100 can indicate that the pair of media content items is a complementary pair.

In a more particular example, for media content items in the update, process 100 can generate a vector in any suitable embedding space that represents topics and other content properties associated with the media content item contained in the update. Continuing further with this particular example, in some embodiments, process 100 can generate vectors in the embedding space for different media content items in a content database that represent topics and other content properties associated with a media content item in the content database. Continuing still further with this particular example, in some embodiments, process 100 can identify media content items in the content database or media content items contained in the update that are each associated with multiple topics or content properties that are most similar to the media content items being presented as part of the update (e.g., presented media content items but not yet seen by the user) by computing any suitable similarity metric between the vector associated with media content item and the one or more vectors associated with the other media content items (e.g., cosine similarity, Euclidean distance, and/or any other suitable similarity metric).

In some embodiments, process 100 can continue at 106 by selecting any suitable number of media content items from the update at block 102 for display in a display area of the user interface. In some embodiments, for example as discussed below in FIGS. 3A-3E, the media content items selected at 106 can be displayed in a user interface, and/or queued for display in the user interface. In some embodiments, the media content items selected by process 100 at block 106 can each be one part of a complementary pair. For example, in some embodiments, process 100 can select half of the media content items, such as one media content item from each of the complementary pairs determined at block 104.

In some embodiments, process 100 can continue at 108 by selecting any suitable number of media content items from the update at block 102 to be queued in a non-navigable area of the user interface. In some embodiments, the media content items selected by process 100 at 108 can each be one part of a complementary pair. For example, in some embodiments, process 100 can select half of the media content items, such as the remaining media content item (i.e., the item that was not selected at block 106) from each of the complementary pairs determined at block 104. In some embodiments, for example as discussed below in FIGS. 3A-3E, the media content items selected at 108 can be arranged in a complementary queue.

In some embodiments, process 100 can continue at 110 by displaying at least one media content item from the media content items selected at block 106. For example, a particular number of media content items can be selected for presentation within a window of media content items being presented in the user interface. In some embodiments, process 100 can leave at least one media content item in a queue for display at 110. For example, remaining media content items that were selected for presentation to the user can be placed in a queue for display.

In some embodiments, process 100 can continue at 112 when process 100 receives a user engagement signal. For example, in some embodiments, process 100 can determine that a user has interacted with at least one of the media content items displayed at block 110. In some embodiments, a user engagement signal can be a positive and/or negative indication of a particular media content item. For example, as discussed below in connection with FIGS. 3B-3C, a user can select any suitable icon and/or button displayed in connection with the media content item to indicate a positive reaction (e.g., "like," "favorite," etc.) to the particular media content item. In another example, as discussed below in connection with FIGS. 3D-3E, a user can select any suitable icon and/or button displayed in connection with the media content item to indicate a negative reaction (e.g., "dislike," "remove recommendation," etc.) to the particular media content item.

In some embodiments, process 100 can continue at 114 by selecting a media content item in the non-navigable queue. In some embodiments, process 100 can select a media content item that is part of the same complementary pair as the particular media content item that is associated with the user engagement signal received at block 112. In some embodiments, process 100 can additionally select any remaining media content items in the queue for display, but which have not been displayed, and replace these items with media content item(s) from the non-navigable queue.

In some embodiments, process 100 can continue at 116 when process 100 displays the media content item that was moved, at block 114, from the non-navigable queue to the display queue.

In some embodiments, process 100 can loop at 118 when process 100 receives another quantity of media items in an update from the server. For example, in some embodiments, a user can scroll through the entirety of the media content items in the display queue from block 106, and process 100 can request additional media content items to re-populate the display with new content for the user to view in the user interface. In this example, in some embodiments, process 100 can be executed with the next round of media content items received in the update.

In some embodiments, process 100 can end at any suitable time.

Figure 2:
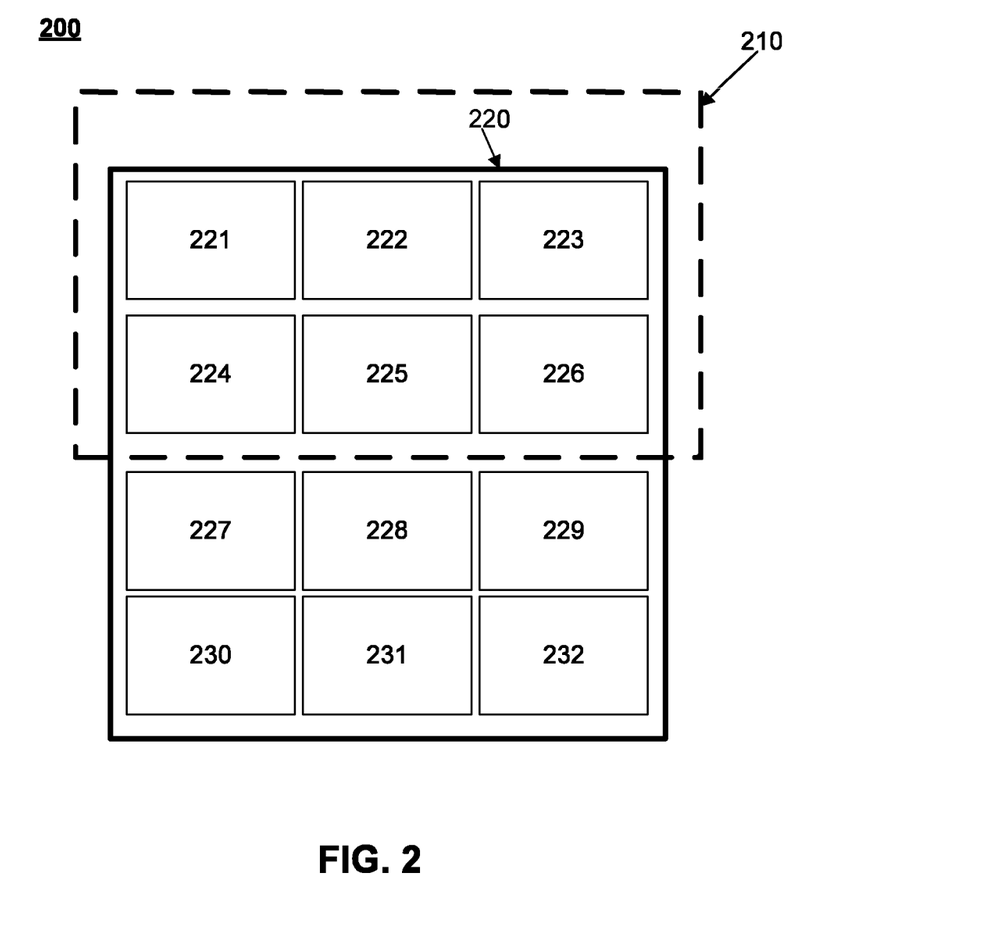
FIG. 2 shows an example illustration of a media content display area with multiple regions in accordance with some embodiments of the disclosed subject matter.
Figure 3A:
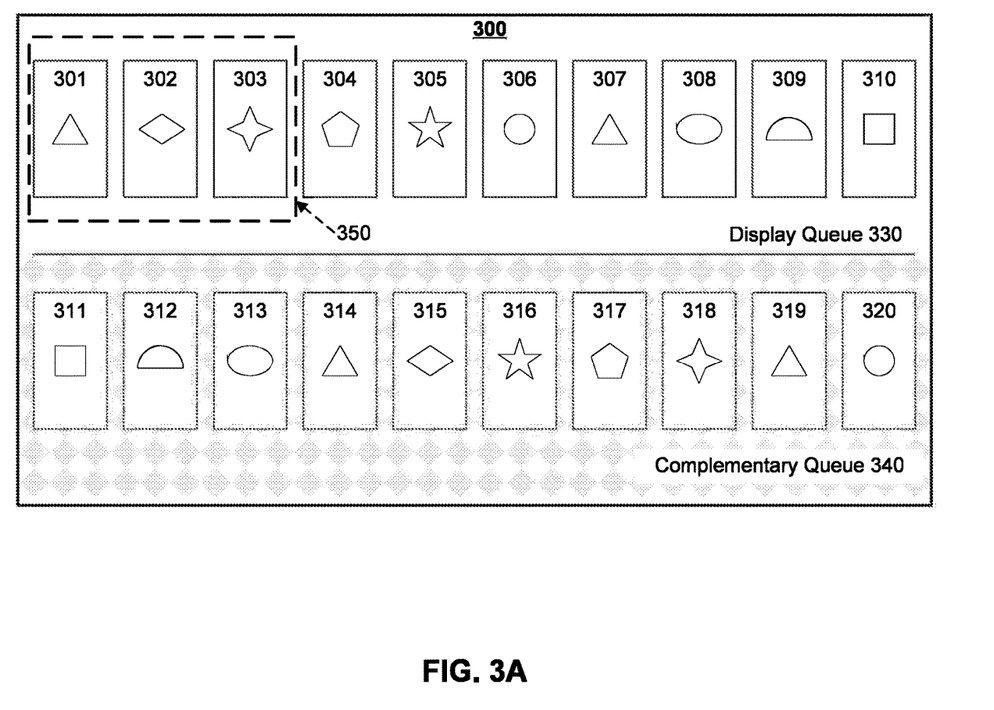
FIGS. 3A-3E show example illustrations of a media content display area presenting media content items based on complementary pairs in accordance with some embodiments of the disclosed subject matter.

Turning to FIG. 2, an example illustration of a user interface 200 with a media container that has multiple regions in accordance with some embodiments of the disclosed subject matter is shown. As shown, user interface 200 includes display 210 and media container 220.

In some embodiments, user interface 200 can be associated with any suitable program and/or application. For example, in some embodiments, user interface 200 can be a graphical user interface (GUI) for any suitable media application such as a photo viewing and/or editing application; an audio application that can play audio files while also displaying artist, song, and/or album information; a video streaming application that is connected to a content delivery network and/or streaming service, etc.

Figure 5:
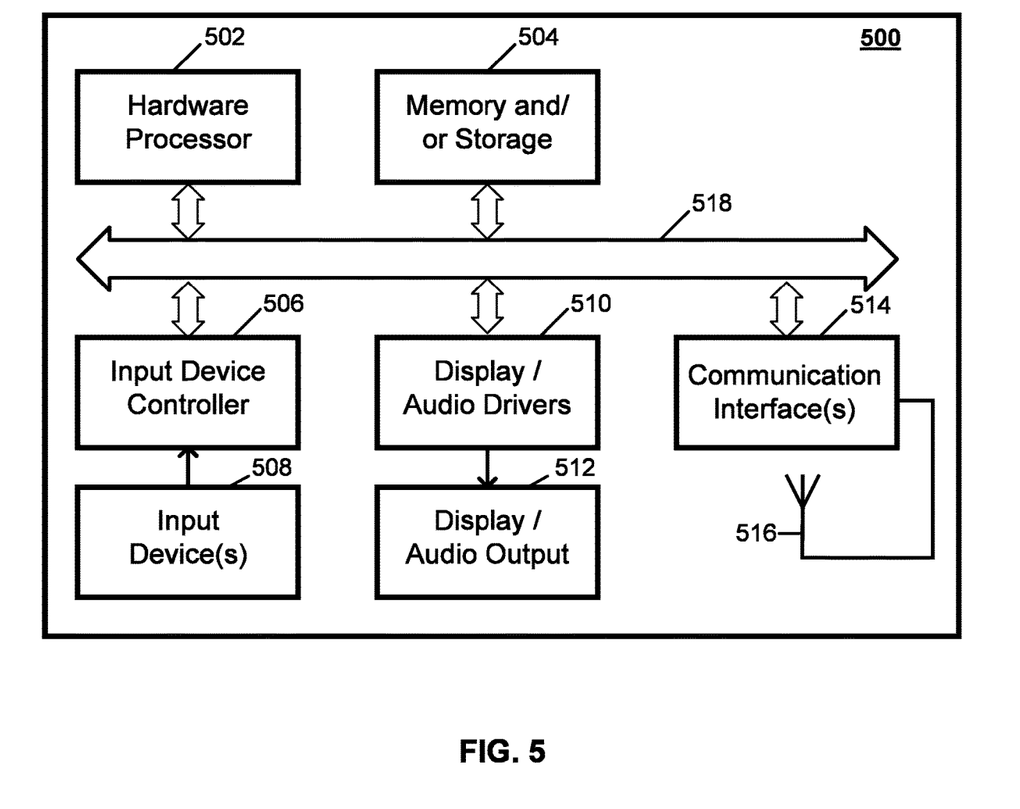
FIG. 5 shows an example block diagram of hardware that can be used in a server and/or a user device of FIG. 4 in accordance with some embodiments of the disclosed subject matter.

In some embodiments, display 210 can be any suitable display device, such as display devices 512 as discussed below in connection with FIG. 5.

In some embodiments, media container 220 can include any suitable user interface elements and/or components such as video cards 221-232. In some embodiments, video cards 221-232 can include any suitable information on a recording, presentation, broadcast, and/or other suitable presentation of video content and/or media content. For example, in some embodiments, video cards 221-232 can include thumbnail images, text (e.g., title of the video, username of the video creator, etc.), tags, emoji, and/or any other suitable content. In some embodiments, video cards 221-232 can be selectable, and (upon selection) can navigate a user to a media player where a video (indicated in the selected video card) can begin playback. In some embodiments, items displayed in media container 220 can be any suitable visual indication of any suitable media content item(s). For example, in some embodiments, media container 220 can display cards associated with a playlist of videos, an album and/or individual songs, photo albums, and/or any other suitable type of media content item. In this example, in some embodiments, any reference to video cards can indicate any suitable media content item.

In some embodiments, video cards 221-232 can include any suitable additional user interface elements and/or components. For example, in some embodiments, video cards 221-232 can include buttons such as "like" and/or "dislike" buttons, additional menu icons and/or indicators (e.g., three horizontal line icon or hamburger icon, three vertical dots icon or kebab icon, etc.) that a user can interact with to navigate additional options for each video card. In some embodiments, the additional user interface elements and/or components on video cards 221-232 can be used to generate a user engagement signal. For example, a user can "like" video card 223 in media container 220 by selecting an appropriate button (not shown) included in video card 223. In some embodiments, a user engagement signal that is based on user interaction with a video card in media container 220 can be included in a request to a server which selects additional video content to display in media container 220.

In some embodiments, media container 220 can be displayed in any suitable region within user interface 200 and can have any suitable number of video cards displayed per row and/or per column. In some embodiments, as shown in FIG. 2, the area of media container 220 can be larger than the visible area of display 210. For example, in some embodiments, video cards 227-232 can be received based on media container 220 and/or user display 200 sending a request for additional video content. Continuing this example, in some embodiments, media container 220 can queue video cards 227-232 for presentation on any suitable display device. That is, in some embodiments, media container 220 can use any suitable mechanisms, such as process 100 as described above in connection with FIG. 1, to sort, organize, append, and/or otherwise determine the presentation order of video cards 227-232 prior to the presentation of video cards 227-232 on display 210.

In some embodiments, media container 220 can present queued video cards 227-232 based on any suitable mechanism. For example, in some embodiments, media container 220 can present queued video cards 227-229 in display 210 when a user scrolls upwards, which can also remove the presentation of video cards 221-223 from display 210. In some embodiments, media container 220 can create additional queues, such as a complementary queue 340 as discussed below in connection with FIGS. 3A-3E, where video cards in the additional queue(s) remain in the additional queue(s) without ever being presented on display 210.

Turning to FIG. 3A, an example illustration of a video container 300 with multiple queues in accordance with some embodiments is shown. In some embodiments, video container 300 can be any suitable user interface element such as media container 220 as described above in connection with FIG. 2. In some embodiments, video cards in video container 300 can include any suitable elements, as described above in connection with video cards 221-232.

In some embodiments, video container 300 can include any suitable segmented zone, queue, sub-container, etc., within video container 300. In some embodiments, video container 300 can include a display queue 330 and a complementary queue 340. For example, in some embodiments, video cards 301-310 in display queue 330 can be accessed by a user through interaction with display 350. As a particular example, in some embodiments, video cards 301-303 can be displayed on display 350 (as indicated by the dashed box in FIG. 3A), and a user can access video card 305 through any suitable input to display 350, such as scrolling, etc.

In some embodiments, video cards in any suitable queue of video container 300, such as complementary queue 340, can remain inaccessible to a user.

In some embodiments, video container 300 can receive video cards 301-320 based on any suitable mechanism. In some embodiments, video container 300 can receive video cards 301-320 based on a request made by video container 300 to a server associated with video container 300. In some embodiments, video container 300 can request any suitable number of video cards in the update request.

In some embodiments, video container 300 can perform any suitable analysis on video cards 301-320. For example, in some embodiments, video container 300 can identify any suitable properties and/or metadata associated with each video card, such as media content types, title, creator, categorical tag(s), thumbnail image content, and/or any other suitable metadata. For the purposes of illustration, as shown in FIGS. 3A-3E, video cards 301-320 are each displayed with a shape (e.g., circle, triangle, etc.). As shown, in some embodiments, each shape included with video cards 301-320 can indicate a category or type of content included in the particular video card. For example, video card 301 is shown in FIGS. 3A-3E with a triangle. In this example, the triangle indication can indicate that the content of video card 301 is any suitable subject matter, such as "soccer", in some embodiments. Similarly, in another example, video card 302 is shown in FIGS. 3A-3E with a diamond which can, in some embodiments, indicate that the content of video card 302 is any other suitable subject matter (i.e., that is different from video card 301) such as "cooking." It should be noted that video cards shown with the same shape indication are intended to share the same media properties, such as the same subject matter. That is, in some embodiments, video cards 307, 314, and 319, which are also shown in FIGS. 3A-3E with a triangle, can also contain content that is related to "soccer."

In some embodiments, video container 300 can sort video cards 301-320 based on any suitable properties and/or metadata. For example, in some embodiments, video container 300 can assign video cards 301-310 to display queue 330. Continuing this example, in some embodiments, video container 300 can determine that video cards 311-320 are complementary videos to video cards 301-310, respectively, and can assign video cards 311-320 to complementary queue 340.

In some embodiments, video container 300 can use any suitable mechanism to determine complementary video card pairs. In some embodiments, complementary videos can be determined based on a similarity score between two particular video cards received in an update. In some embodiments, video container 300 can determine that two video cards have a similarity score below a particular threshold value and/or in a range of values. For example, a cosine similarity calculation can determine that video card 301 and video card 311 have a similarity score of 0.3, which can be below a particular threshold value of 0.5. In this example, in some embodiments, video container 300 can determine that video card 311 are complementary videos and can store the indication in any suitable manner.

In some embodiments, video container 300 can request similarity scores from a server that fulfills requests for more videos from video container 300. In some embodiments, video container 300 can determine, for each possible pairing within video cards 301-320, a similarity score between two video cards. In some embodiments, the similarity scores can be any suitable numeric value. For example, in some embodiments, the similarity score for the pairing of {video card 301, video card 302} can be 0.85, or 85%, which can indicate that video card 301 and video card 302 are more similar than dissimilar. Continuing this example, in some embodiments, video cards 301 and 302 can both contain video demonstrations of scientific concepts (e.g., a demonstration estimating $\pi$ ("pi"), and a demonstration to measure the speed of light) and can have similar run-times but which are produced by different channels and/or persons. In some embodiments, the similarity scores can be normalized such that all the similarity scores are between zero and one (0 and 1). Note that, in the above example, the subject matter of the videos can be included in determining the similarity score between two videos in some embodiments. In some embodiments, any suitable video attribute, content type, and/or combination of properties (e.g., video resolution, frame rate, aspect ratio, video duration, language spoken in audio, filming location and/or background imagery, etc.) can be used in determining similarity scores between two videos.

In some embodiments, video container 300 can use any suitable mechanism to determine the similarity scores for all possible pairings of video cards 301-320. For example, in some embodiments, video container 300 can input a pair of video cards (e.g., video card 301 and video card 311) into a machine-learning model, and the machine learning model can output a similarity score of 0.3 for the input pair. In some embodiments, any suitable image analysis, audio processing, and/or text processing can be used in determining similarity scores. In some embodiments, video container 300 can determine similarity scores using any suitable property and/or metadata included with the video cards and/or video associated with each video card. In some embodiments, video container 300 can use frames from the videos associated with the video cards to determine a similarity score between two videos. In some embodiments, video container 300 can use a transcript from videos associated with the video cards (e.g., an existing transcript associated with the video and/or a transcript automatically generated from audio tracks within the videos). For example, video container 300 can determine similarity scores for the pairings of: {video card 301, video card 302}, {video card 301, video card 303}, {video card 301, video card 304}, . . . {video card 302, video card 303}, etc. In this example, video container 300 can determine a total of one hundred and ninety (190) similarity scores, as the video container has a set of twenty (20) video cards and is choosing any two (2) video cards as a sample from the set. In some embodiments, video container 300 can store the determined similarity scores using any suitable mechanism.

In some embodiments, video container 300 can assign any suitable number of video cards received in the update to display queue 330 based on any suitable mechanisms. In some embodiments, video container 300 can populate display queue 330 with half of the video cards received in the update and can arrange the video cards in any suitable order. In some embodiments, video container 300 can calculate similarity scores between pairs of video cards where video container 300 has already assigned one of the video cards in the pair to display queue 330, and the other video card in the pair has not been assigned to complementary queue 340.

In some embodiments, video container 300 can filter the determined similarity scores. For example, in some embodiments, video container 300 can keep video card pairings where the similarity score is below a threshold value. As a particular example, video card 301 can have a video title of "Soccer Recaps" and video card 307 can have a video title of "Best soccer goals." In this particular example, video container 300 can determine the similarity score, using the video titles as inputs, to be above the threshold value—that is, video cards 301 and 307 are similar videos. As another particular example, video card 311 can have a video title of "Cooking with Your Favorite Internet Chef." In this particular example, video container 300 can determine the similarity score, using the video titles as inputs, between video card 301 and video card 311 is 0.3, and that the similarity score is below a threshold value of 0.5—that is, video cards 301 and 311 are complementary. In some embodiments, video container 300 can create an indication of two video cards that have a similarity score below a threshold value. For example, in some embodiments, video container 300 can store an indication that video card 301 and video card 311 are complements of each other.

In some embodiments, video container 300 can assign video cards such as video cards 311-320 to complementary queue 340. In some embodiments, video container 300 can assign a particular video card to complementary queue 340 with an indication of which video card in display queue 330 is complementary to that particular video card. In some embodiments, video container 300 can copy the order of video cards in display queue 330 in the order of complementary video cards in complementary queue 340. For example, in some embodiments, as shown, video card 301 can have video card 311 as its complement, as video card 301 (video card 311) is arranged in the first position in display queue 330 (complementary queue 340).

Figure 3B:
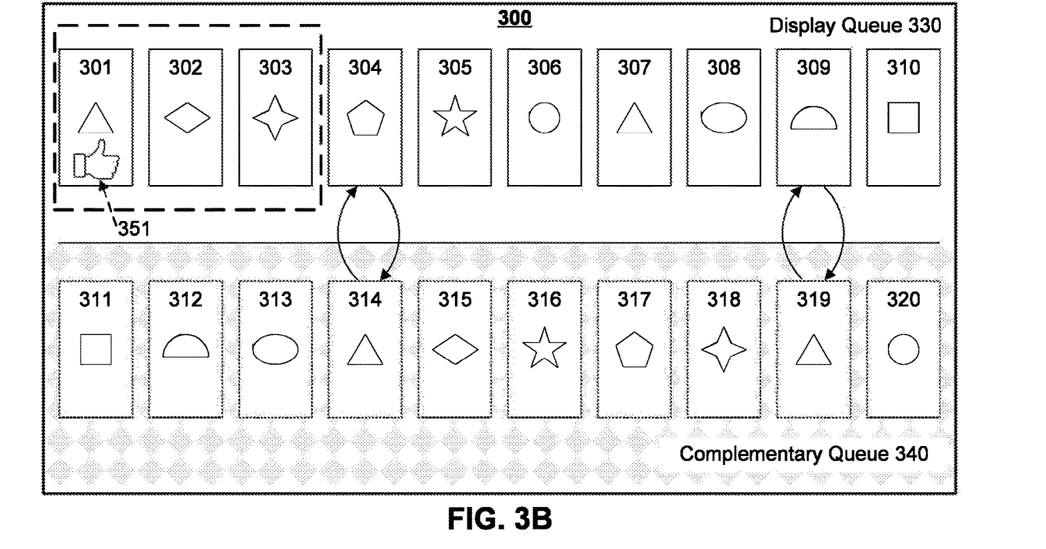

In some embodiments, as shown in FIG. 3B, video container 300 can update the position and queue arrangements of video cards in display queue 330 and/or complementary queue 340 based on any suitable conditions. In some embodiments, video container 300 can receive a positive user engagement signal (e.g., "like" 351) from a video card (e.g., video card 301) in display queue 330 which is also displayed on display 350. In some embodiments, video container 300 can use "like" 351 and video card 301 to determine that there are video cards in complementary queue 340 which are similar to video card 301. For example, in some embodiments, video container 300 can use the similarity scores to determine that video cards 314 and 319 are similar to video card 301. In some embodiments, video container 300 can use "like" 351 and video card 301 to determine that there are video cards in display queue 330 which are dissimilar to video card 301. For example, video container 300 can use the similarity scores to determine that video cards 304 and 309 are dissimilar to video card 301 and can additionally determine that the complementary video cards to video cards 304 and 309 (i.e., video cards 314 and 319) are similar to video card 301.

Figure 3C:
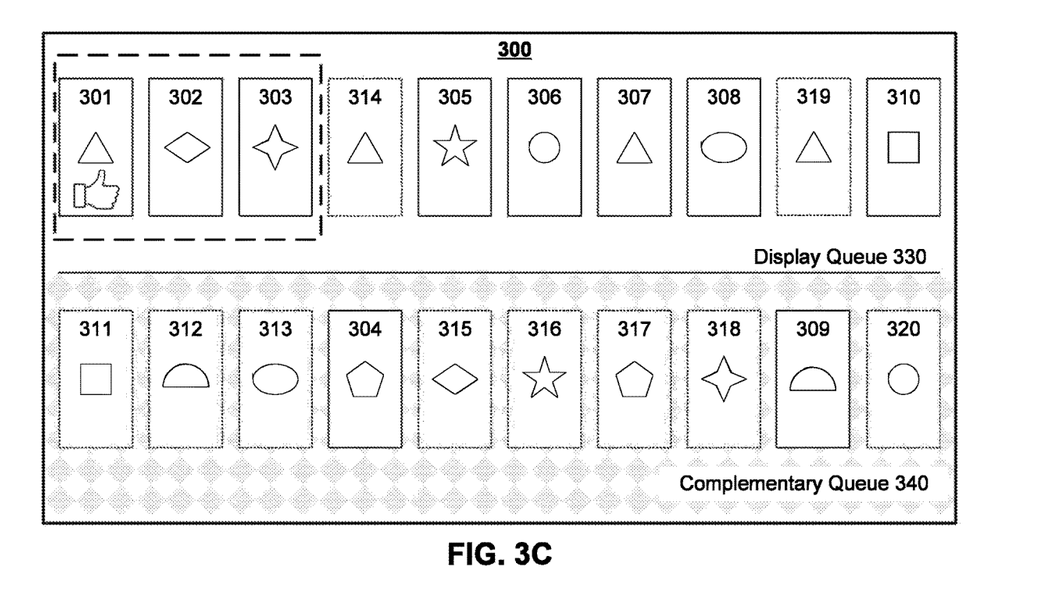

In some embodiments, video container 300 can select video cards in the complementary queue which are similar to the video card which received the positive user engagement signal and can move the selected video cards to the display queue. For example, as shown in FIGS. 3B and 3C, in some embodiments, video container 300 can select video cards 314 and 319 from complementary queue 340 and can move video cards 314 and 319 to display queue 330. In some embodiments, video container 300 can swap the video cards in display queue 330 (i.e., video cards 304 and 309) with their complementary video cards (i.e., video cards 314 and 319, respectively). For example, in some embodiments, video cards 314 and 319 appear in display queue 330 in the position(s) that video cards 304 and 309 had previously been queued for display, as shown in FIG. 3C. Continuing this example, video cards 304 and 309 are assigned to complementary queue 340, as shown in FIG. 3C.

Figure 3D:
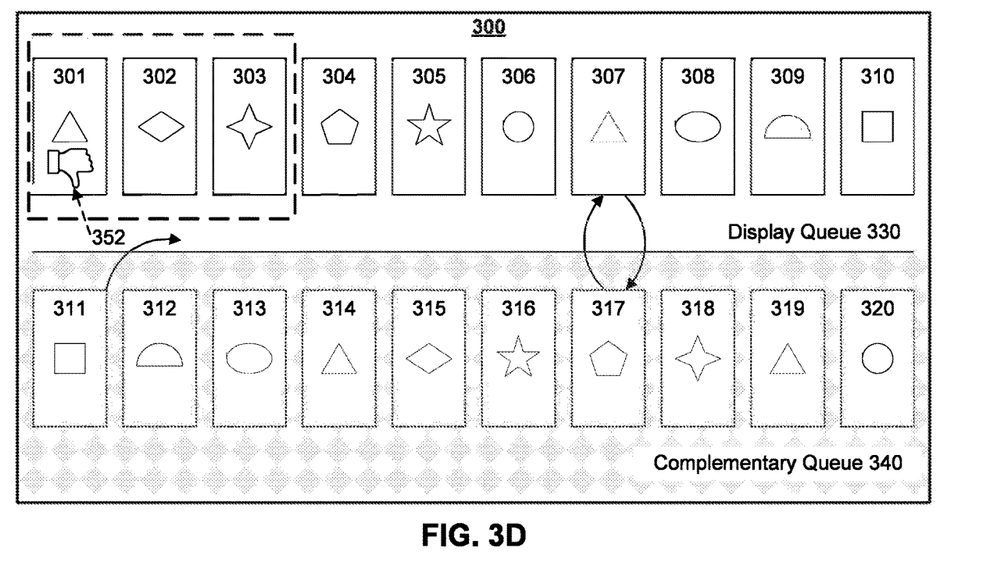

In some embodiments, video container 300 can make additional updates to display queue 330 and/or complementary queue 340 based on any suitable conditions. In some embodiments, video container 300 can receive a negative user engagement signal (e.g., "dislike" 352) from a video card (e.g., video card 301) in display queue 330 which is also displayed on display 350. In some embodiments, video container 300 can use "dislike" 352 and video card 301 to determine that there are video cards in display queue 330 that are similar to video card 301, and that the user is likely to dislike the video cards that are similar to video card 301. Additionally, in some embodiments, video container 300 can determine that there are video cards in complementary queue 340 which are complementary to video card 301. For example, in some embodiments, video container 300 can use the similarity scores to determine that video card 307 is similar to video card 301, and that a user is likely to dislike video card 307.

Figure 3E:
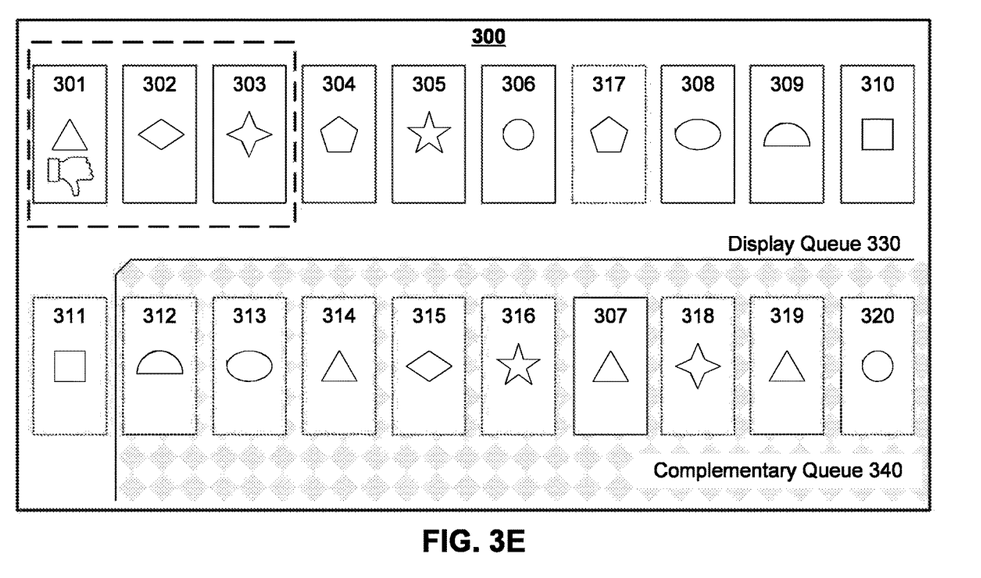

In some embodiments, video container 300 can select video cards which are similar to the video card which received the negative user engagement signal, and video container 300 can remove the selected video cards from the display queue. For example, as shown in FIGS. 3D and 3E, in some embodiments, video container 300 can select video card 307 in display queue 330 and can move video card 307 to complementary queue 340. In this example, in some embodiments, video container 300 can swap the video card(s) in display queue 330 (i.e., video card 307) with their complement video card(s) (i.e., video card 317). In this example, in some embodiments, video card 317 can appear in display queue 330 in the position(s) that video card 307 had previously been queued, as shown in FIG. 3E. Continuing this example, video card 307 is assigned to complementary queue 340, as shown in FIG. 3E.

Additionally, video container 300 can perform any suitable actions with the video card that is complementary to the video card which received the negative user engagement signal. For example, as shown in FIG. 3D, video card 311 can be the complement to video card 301, and video container 300 can append video card 311 to the end of display queue 330. That is, as shown in FIG. 3E, display queue 330 can have an additional video card 311 queued for display after video card 310.

In some embodiments, video container 300 can append any suitable number of video cards to the end of display queue 330 based on any suitable conditions. For example, in some embodiments, video container 300 can receive a neutral user engagement signal from videos that are in display queue 330 and are also displayed on display 350. In some embodiments, video container 300 can append complementary videos for the displayed videos to the end of display queue 330. For example, a user can scroll through video cards 301-303 without selecting a "like" and/or a "dislike" for any of the video cards 301-303. Continuing this example, in some embodiments, video container 330 can append complementary video cards 311-313 to the end of display queue 330, as shown in FIG. 3E where video card 311 has been removed from complementary queue 340 and added to the end of display queue 320.

Figure 4:
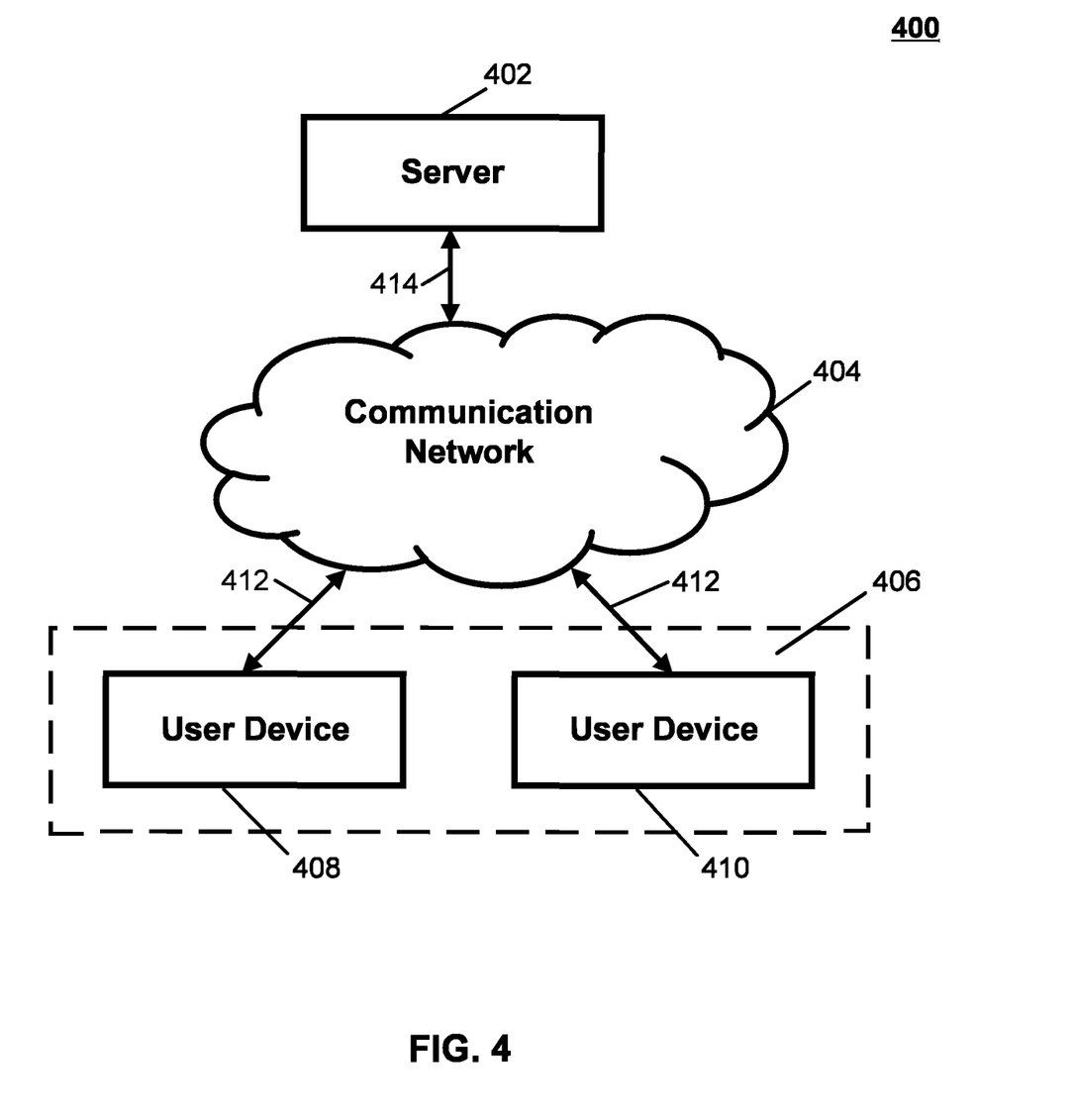
FIG. 4 shows an example block diagram of a system that can be used to implement mechanisms described herein in accordance with some embodiments of the disclosed subject matter.

Turning to FIG. 4, an example 400 of hardware for presenting recommended media content items based on complementary media content item pairs in accordance with some embodiments is shown. As illustrated, hardware 400 can include a server 402, a communication network 404, and/or one or more user devices 406, such as user devices 408 and 410.

Server 402 can be any suitable server(s) for storing information, data, programs, media content, and/or any other suitable content. In some embodiments, server 402 can perform any suitable function(s).

Communication network 404 can be any suitable combination of one or more wired and/or wireless networks in some embodiments. For example, communication network can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

User devices 406 can include any one or more user devices suitable for use with process 100. In some embodiments, user device 406 can include any suitable type of user device, such as speakers (with or without voice assistants), mobile phones, tablet computers, wearable computers, laptop computers, desktop computers, smart televisions, media players, game consoles, vehicle information and/or entertainment systems, and/or any other suitable type of user device.

Although server 402 is illustrated as one device, the functions performed by server 402 can be performed using any suitable number of devices in some embodiments. For example, in some embodiments, multiple devices can be used to implement the functions performed by server 402.

Although two user devices 408 and 410 are shown in FIG. 4 to avoid overcomplicating the figure, any suitable number of user devices, (including only one user device) and/or any suitable types of user devices, can be used in some embodiments.

Server 402 and user devices 406 can be implemented using any suitable hardware in some embodiments. For example, in some embodiments, devices 402 and 406 can be implemented using any suitable general-purpose computer or special-purpose computer and can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 504, an antenna 516, and a bus 518.

Hardware processor 502 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 502 can be controlled by a computer program stored in memory and/or storage 504. For example, in some embodiments, the computer program can cause hardware processor 502 to perform functions described herein.

Memory and/or storage 504 can be any suitable memory and/or storage for storing programs, data, documents, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from a mouse, from one or more buttons, from a voice recognition circuit, from one or more microphones, from a camera, from an optical sensor, from an accelerometer, from a temperature sensor, from a near field sensor, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks, such as network 404 as shown in FIG. 4. For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some embodiments. In some embodiments, antenna 516 can be omitted.

Bus 518 can be any suitable mechanism for communicating between two or more components 502, 504, 506, 510, and 514 in some embodiments.

Any other suitable components can be included in hardware 500 in accordance with some embodiments.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that at least some of the above-described blocks of process 100 can be executed or performed in any order or sequence not limited to the order and sequence shown in and described in connection with FIG. 1. Also, some of the above blocks of process 100 can be executed or performed substantially simultaneously where appropriate or in parallel to reduce latency and processing times. Additionally or alternatively, some of the above described blocks of process 100 can be omitted.

Accordingly, methods, systems, and media for presenting recommended media content items based on complementary pairs are provided.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method comprising:
   receiving an update to a display area within a user interface, wherein the update includes a plurality of media content items and wherein the display area comprises (i) a first content queue that is displayed and that is navigable by a user of the user interface and (ii) a second content queue that is concealed from display and that is not navigable by the user of the user interface;
   loading the plurality of media content items into the first content queue that is displayed and navigable by the user;
   determining, based on a second plurality of media content items obtained from a content database, a plurality of complementary pairs of media content items, each complementary pair of the plurality of complementary pairs indicating a first media content item from the plurality of media content items and a complementary second media content item from the second plurality of media content items;
   loading the second plurality of media content items into the second queue that is concealed and is not navigable by the user;
   causing at least one media content item from the plurality of media content items to be displayed in the first content queue of the display area in response to user input;
   determining that one or more particular media content items of the plurality of media content items loaded into the first content queue are dissimilar to the at least one media content item displayed in the display area, wherein the one or more particular media content items have one or more corresponding complementary second media content items from the second plurality of media content items indicated by one or more complimentary pairs from the plurality of complementary pairs;
   replacing the one or more particular media content items in the first content queue with the one or more corresponding complementary second media content items in the second content queue based on at least determining that the one or more particular media content items are dissimilar to the at least one media content item; and
   causing the one or more corresponding complementary second media content items to be presented in the first content queue of the display area.

2. The method of claim 1, further comprising:
   determining that the one or more corresponding complementary second media content items in the second content queue are similar to the at least one media content item displayed in the display area,
   wherein replacing the one or more particular media content items in the first content queue with the one or more corresponding complementary second media content items in the second content queue is further based on determining that the one or more corresponding complementary second media content items in the second content queue are similar to the at least one media content item.

3. The method of claim 1, wherein determining each given complementary pair of media content items from the plurality of complementary pairs of media content items comprises:
   determining a similarity score between the first media content item and the second media content item; and
   responsive to determining that the similarity score is less than a threshold value, generating an indication that the first media content item is associated with the second media content item as the given complementary pair of media content items.

4. The method of claim 3, wherein the similarity score is determined by calculating cosine similarity between a first vector representing the first media content item and a second vector representing the second media content item.

5. The method of claim 1, wherein replacing the one or more particular media content items in the first content queue with the one or more corresponding complementary second media content items in the second content queue is further based on:
   determining first similarity scores between the at least one media content item and each of the one or more particular media content items;
   determining second similarity scores between each of the one or more particular media content items and each of the one or more corresponding complementary second media content item; and
   comparing the first similarity scores and the second similarity scores to a threshold similarity value.

6. The method of claim 5, further comprising:
  determining that a user that provided the user input is likely to dislike the one or more particular media content items based on comparing the first similarity scores to the threshold similarity value; and
  determining that the user that provided the user input is likely to interact with the one or more corresponding complementary second media content items based on comparing the second similarity scores to the threshold similarity value.

7. A system for presenting recommended media content items, the system comprising:
  a memory; and
  a hardware processor that is configured to:
    receive an update to a display area within a user interface, wherein the update includes a plurality of media content items and wherein the display area comprises (i) a first content queue that is displayed and that is navigable by a user of the user interface and (ii) a second content queue that is concealed from display and that is not navigable by the user of the user interface;
    load the plurality of media content items into the first content queue that is displayed and navigable by the user;
    determine, based on a second plurality of media content items obtained from a content databases, a plurality of complementary pairs of media content items, each complementary pair of the plurality of complementary pairs indicating a first media content item from the plurality of media content items and a complementary second media content item from the second plurality of media content items;
    loading the second plurality of media content items into the second queue that is concealed and is not navigable by the user;
    causing at least one media content item from the plurality of media content items to be displayed in the first content queue of the display area in response to user input;
    determine that one or more particular media content items of the plurality of media content items loaded into the first content queue are dissimilar to the at least one media content item displayed in the display area, wherein the one or more particular media content items have one or more corresponding complementary second media content items from the second plurality of media content items indicated by one or more complimentary pairs from the plurality of complementary pairs;
    replace the one or more particular media content items in the first content queue with the one or more corresponding complementary second media content items in the second content queue based on at least determining that the one or more particular media content items are dissimilar to the at least one media content item; and
    cause the one or more corresponding complementary second media content items to be presented in the first content queue of the display area.

8. The system of claim 7, wherein the hardware processor is further configured to:
  determine that the one or more corresponding complementary second media content items in the second content queue are similar to the at least one media content item displayed in the display area; and
  replace the one or more particular media content items in the first content queue with the one or more corresponding complementary second media content items in the second content queue further based on determining that the one or more corresponding complementary second media content items in the second content queue are similar to the at least one media content item.

9. The system of claim 7, wherein the hardware processor is further configured to determine each given complementary pair of media content items from the plurality of complementary pairs of media content items by at least being configured to:
  determine a similarity score between the first media content item and the second media content item; and
  responsive to determining that the similarity score is less than a threshold value, generate an indication that the first media content item is associated with the second media content item as the given complementary pair of media content items.

10. The system of claim 9, wherein the hardware processor is further configured to determine the similarity score by at least being configured to calculate a cosine similarity between a first vector representing the first media content item and a second vector representing the second media content item.

11. The system of claim 7, wherein the hardware processor is further configured to replace the one or more particular media content items in the first content queue with the one or more corresponding complementary second media content items in the second content queue by at least being configured to:
  determine first similarity scores between the at least one media content item and each of the one or more particular media content items;
  determine second similarity scores between each of the one or more particular media content items and each of the one or more corresponding complementary second media content item; and
  compare the first similarity scores and the second similarity scores to a threshold similarity value.

12. The system of claim 11, wherein the hardware processor is further configured to:
  determine that a user that provided the user input is likely to dislike the one or more particular media content items based on comparing the first similarity scores to the threshold similarity value; and
  determine that the user that provided the user input is likely to interact with the one or more corresponding complementary second media content items based on comparing the second similarity scores to the threshold similarity value.

13. A non-transitory computer-readable medium containing computer executable instructions that, when executed by one or more processors, cause the one or more processors to:
  receive an update to a display area within a user interface, wherein the update includes a plurality of media content items and wherein the display area comprises (i) a first content queue that is displayed and that is navigable by a user of the user interface and (ii) a second content queue that is concealed from display and that is not navigable by the user of the user interface;
  load the plurality of media content items into the first content queue that is displayed and navigable by the user;
  determine, based on a second plurality of media content items obtained from a content databases, a plurality of complementary pairs of media content items, each complementary pair of the plurality of complementary pairs indicating a first media content item from the plurality of media content items and a complementary second media content item from the second plurality of media content items;

loading the second plurality of media content items into the second queue that is concealed and is not navigable by the user;

causing at least one media content item from the plurality of media content items to be displayed in the first content queue of the display area in response to user input;

determine that one or more particular media content items of the plurality of media content items loaded into the first content queue are dissimilar to the at least one media content item displayed in the display area, wherein the one or more particular media content items have one or more corresponding complementary second media content items from the second plurality of media content items indicated by one or more complimentary pairs from the plurality of complementary pairs;

replace the one or more particular media content items in the first content queue with the one or more corresponding complementary second media content items in the second content queue based on at least determining that the one or more particular media content items are dissimilar to the at least one media content item; and cause the one or more corresponding complementary second media content items to be presented in the first content queue of the display area.

14. The non-transitory computer-readable medium of claim 13, wherein execution of the instructions further causes the one or more processors to:

determine that the one or more corresponding complementary second media content items in the second content queue are similar to the at least one media content item displayed in the display area; and replace the one or more particular media content items in the first content queue with the one or more corresponding complementary second media content items in the second content queue further based on determining that the one or more corresponding complementary second media content items in the second content queue are similar to the at least one media content item.

15. The non-transitory computer-readable medium of claim 13, wherein execution of the instructions cause the one or more processors to determine each given complementary pair of media content items from the plurality of complementary pairs of media content items by at least causing the one or more processors to:

determine a similarity score between the first media content item and the second media content item; and responsive to determining that the similarity score is less than a threshold value, generate an indication that the first media content item is associated with the second media content item as the given complementary pair of media content items.

16. The non-transitory computer-readable medium of claim 15, wherein execution of the instructions cause the one or more processors to determine the similarity score by at least causing the one or more processors to calculate a cosine similarity between a first vector representing the first media content item and a second vector representing the second media content item.

17. The non-transitory computer-readable medium of claim 13, wherein execution of the instructions cause the one or more processors to replace the one or more particular media content items in the first content queue with the one or more corresponding complementary second media content items in the second content queue further by at least causing the one or more processors to:

determine first similarity scores between the at least one media content item and each of the one or more particular media content items;

determine second similarity scores between each of the one or more particular media content items and each of the one or more corresponding complementary second media content item; and compare the first similarity scores and the second similarity scores to a threshold similarity value.

18. The non-transitory computer-readable medium of claim 17, wherein execution of the instructions further causes the one or more processors to:

determine that a user that provided the user input is likely to dislike the one or more particular media content items based on comparing the first similarity scores to the threshold similarity value; and determine that the user that provided the user input is likely to interact with the one or more corresponding complementary second media content items based on comparing the second similarity scores to the threshold similarity value.

\* \* \* \* \*